United States Patent Office 3,639,304
Patented Feb. 1, 1972

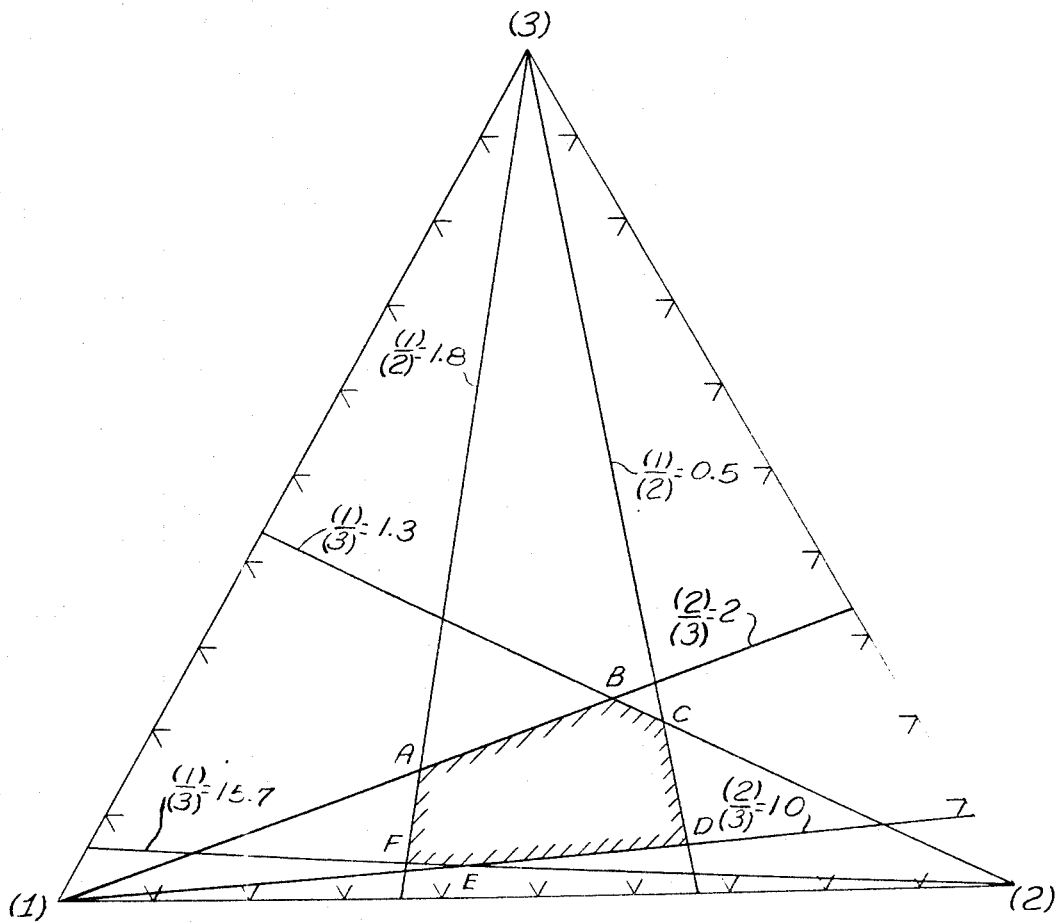

3,639,304
SELF-EXTINGUISHING POLYETHYLENE FOAMS COMPRISING AN ANTIMONY COMPOUND, A HALOGEN-CONTAINING ALIPHATIC OR CYCLO-ALIPHATIC COMPOUND AND A BROMINE-CONTAINING AROMATIC OR ACYCLIC COMPOUND
Charles F. Raley, Jr., Midland, Mich., assignor to The Dow Chemical Company, Midland, Mich.
Continuation-in-part of abandoned application Ser. No. 606,577, Jan. 3, 1967. This application June 27, 1968, Ser. No. 740,622
Int. Cl. C09k 3/28; C08f 3/04; B29d 27/00
U.S. Cl. 260—2.5 FP          10 Claims

ABSTRACT OF THE DISCLOSURE

A flame retardant or self-extinguishing foamed polyethylene useful as insulation is described. This new composition contains a ternary mixture of flame-retardant agents containing certain amounts of (1) an antimony compound, (2) a halogen-containing aliphatic or cycloaliphatic compound having certain specificities, and (3) a bromine-containing aromatic or acyclic compound of a particular class.

---

The present application is a continuation-in-part of copending application Ser. No. 606,577, filed Jan. 3, 1967, now abandoned.

This invention relates to flame-retardant or self-extinguishing polyethylene foam.

It has been proposed heretofore to impart flame retardancy to polyethylene by incorporating various materials in the polyethylene. Flame retardance has been obtained, for instance, by combining with the polyethylene a solid chlorinated hydrocarbon of high chlorine content such as chlorinated paraffin, and an inorganic flame-retardant substance such as antimony oxide in critical proportions to each other and to the polyethylene. Such compositions are described in U.S. Pats. 2,480,298, 2,590,211, and 2,669,521.

These prior art compositions are generally directed to the making of flame-retardant solid polyethylene, but are not satisfactory for the purpose of making self-extinguishing polyethylene foam.

Accordingly, it is a primary object of this invention to provide flame-retardant or self-extinguishing foamed polyethylene compositions which are not heavily loaded with flame-retardant agents yet produce foamed products possessing highly satisfactory self-extinguishing times of 3 or 4 seconds or less. Another object is to provide flame-retardant or self-extinguishing foamed polyethylene compositions which contain a smaller and more desirable concentration of flame-retardant agents than has hereinbefore been used.

I have now discovered that when 12 to 16 parts by weight of a ternary mixture of flame-retardant agents containing certain amounts of (1) an antimony compound, (2) a halogen-containing aliphatic or cycloaliphatic compound having a hydrogen atom or halogen atom attached to a carbon atom alpha to a halogen-substituted carbon atom and containing from about 50 to 80 percent by weight of halogen as the active self-extinguishing agent, and (3) a bromine-containing aromatic or acyclic compound, the acyclic compound either containing vinylic bromine or not having a hydrogen atom or bromine atom attached to a carbon atom alpha to a bromine-substituted carbon atom, as the passive self-extinguishing agent, is intimately incorporated in 100 parts by weight of polyethylene foam, unexpectedly good self-extinguishing properties are obtained. In contrast, when the same total amount of a mixture of flame-retardant agents which contain only agents (1) and (2) is incorporated in 100 parts of polyethylene foam, a foamed material having vastly inferior self-extinguishing properties is obtained.

In accordance with the present invention, the ternary flame-retardant system incorporated in the polyethylene foam contains the flame-retardant or self-extinguishing agent in the weight ratios within the area ABCDEF of the accompanying drawing.

The accompanying drawing is a trilinear diagram wherein the antimony compound is (1), the halogen-containing aliphatic or cycloaliphatic compound having a hydrogen atom or halogen atom attached to a carbon atom alpha to a halogen-substituted carbon atom and containing from about 50 to about 80 percent by weight of halogen is (2), and the bromine-containing aromatic or acylic compound, said acyclic compound containing vinylic bromine or not having a hydrogen atom or bromine atom attached to a carbon atom alpha to a bromine-substituted carbon atom is (3). Maximum and minimum weight ratios of components are shown in the drawing by equations such as $(1)/(2) = 0.5$.

The extreme weight limits of each component, per 100 parts of polyethylene, are from 3.3 to 10.0 parts by weight of (1) above, 3.0 to 10.6 parts by weight of (2) above, and 0.4 to 3.9 parts by weight of (3) above, but these limits are subject to the above described ratios.

Surprising as it may seem, use of the three different types of flame-retardant agents in admixtures in the proportions herein prescribed provides uniquely superior and entirely unpredictable results. Thus, by preparing the foamed polyethylene compositions of the inventions, products of unexpectedly and significantly superior self-extinguishing properties are obtained.

The antimony compounds useful in the practice of the invention include antimony trioxide, antimony pentoxide, antimony sulfide and the like.

The halogen-containing aliphatic or cycloaliphatic compounds having a hydrogen atom or halogen atom attached to a carbon atom alpha to a halogen-substituted carbon atom which can be used in the practice of the invention include the chlorine-containing compounds such as hexachlorocyclohexane, a chlorinated paraffin wax containing between 50 and 80 by weight of chlorine, and the like, as well as the bromine-containing compounds such as pentabromomonochlorocyclohexane, hexabromocyclohexane, tris (2,3-dibromopropyl)phosphate, brominated polybutadiene latex, and the like. Preferably, these compounds contain from 3 to 40 carbon atoms. These materials function as active or thermally unstable self-extinguishing agents which act to confer good resistance to burning for the first several ignitions but then fall off in effectiveness.

The bromine-containing compounds which can be used in the practice of the invention include aromatic compounds such as hexabromobenzene, pentabromomonochlorobenzene, tetrabromodichlorobenzene, tetrabromobenzene, pentabromophenol, tetrabromobisphenol-A, bis (pentabromophenyl) ether, and tri-bromophenol, as well as acyclic compounds having vinylic bromine or not having a hydrogen atom or bromine atom attached to a carbon atom alpha to a bromine-substituted carbon atom, such as pentaerythrityl tetrabromide, 2,2 - bis(bromomethyl)-1-bromo-3-hydroxypropane, and the like. Preferably, the aromatic compounds contain from 6 to 12 carbon atoms in the aromatic ring structure, and the acyclic compounds contain from 3 to 15 carbon atoms. These agents function in the ternary self-extinguishing system as passive or thermally stable self-extinguishing agents which give poor performance for the first several ignitions but then act to give increasingly better results.

In the practice of the present invention, a homogeneous mobile or flowable gel composition of heat-plastified or molten normally solid polyethylene, 12 to 16 parts per 100 parts of polyethylene of the ternary flame-retardant mixture hereinbefore described, and a volatile organic foaming agent is formed under pressure and thereafter said composition is extruded into a zone of lower pressure sufficient to cause expansion of the extruded material with resultant formation of a foamed flame-retardant polyethylene article composed for the most part of uniformly fine individually-closed thin-walled cells.

Small amounts, e.g. from 0.1 to 2 percent by weight of the polyethylene, of additives such as aluminum stearate, zinc stearate, indigotin, blue copper phthalocyanine or other agents such as finely divided calcium silicate, diatomaceous earth, calcium carbonate, barium sulfate and the like can be employed advantageously as nucleating agents, but are not required in the invention.

The mobile or flowable gel is prepared by placing the ingredients under pressure of the foaming agent, suitably at temperatures above the crystalline melting point of the polyethylene, e.g. at from 90° to 200° C., such as by heating the ingredients in admixture with one another in a pressure resistant vessel or an extruder until a homogenous or substantially uniform flowable gel is obtained. Thereafter, the gel is extruded into a zone of sufficiently lower pressure such as the atmosphere to cause the extruded material to expand with resultant formation of a cellular or foam body.

The gel is preferably extruded at a temperature near or above the melting point of the polyethylene, but higher or lower temperatures can be used. The temperature at which the gel is extruded into the zone of lower pressure will vary depending in part upon the size and arrangement of the apparatus used, the rate of extrusion of the gel, the melting point of the polyethylene and the proportion and kind of volatile organic foaming agent or other additives employed.

In general, the gel can be extruded at a temperature of from about 25° C. below the temperature at which crystallization of the polyethylene causes an observable cloudiness of the gel, up to a temperature of 25° C. above the melting point of the polyethylene. The temperature at which crystallization of the polyethylene causes a cloudiness of the gel can be determined readily by a simple test such as by sealing weighed amounts of the polyethylene and the foaming agent in a glass tube, heating the mixture to a temperature above the melting point of the polyethylene to obtain a transparent uniform gel, then cooling or allowing the gel to cool and observing the temperature at which the gel becomes hazy or cloudy. The temperature at which an observable cloudiness of the gel occurs is hereinafter referred to as the "cloud point."

The pressure to be maintained on the gel prior to extrusion into a zone of lower pressure should be at least about as high as that of the vapor pressure of the volatile organic foaming agent and sufficient to prevent foaming in the extruder or discharge orifice. Pressures of from about 300 to 2,000 lbs./sq. in. or higher, gauge pressure, can be used.

The volatile organic foaming agent should be a nonsolvent or poor solvent for the polyethylene such as 1,2-dichlorotetrafluorethane, dichlorodifluoromethane, isobutane, methyl chloride, 1,1,1-trifluoroethane, ethylidene fluoride, perfluoropropane, 2,2 - difluoropropane, each alone or mixtures thereof and the like, but one that dissolves in the polymer in an amount of up to about 30 percent by weight sufficient to form a mobile or flowable gel and expand the extruded gel to produce a cellular or foamed body. The foaming agent can be employed in amounts of from about 0.05 to 0.5 gram mole per 100 grams of the polyethylene.

In practice, the flame-retardant polyethylene foams can be prepared by feeding solid granules of the polyethylene, together with the ternary flame-retardant mixture in the desired proportion, into the feed hopper of a plastic extruder wherein the polymeric material is pressed and heated to its melting temperature and is forwarded by means of the screw into a mixing and blending zone wherein the heat-softened material is blended under pressure with a volatile organic foaming agent such as 1,2-dichlorotetrafluoroethane also fed to the mixing and blending zone of the extruder, to form a homogenous mobile gel and is brought to a temperature between about 90° and 200° C., preferably from 90° to 120° C., then is extruded into a zone of lower pressure, suitably the atmosphere, wherein the extruded material expands with resultant formation of a foam of substantially uniform fine individually-closed thin-walled cells.

An alternative method of foaming the composition is to incorporate a decomposable blowing agent such as azodicarbonamide, benzene sulfonyl hydrazide, oxybis benzene sulfonyl hydrazide, ammonium carbonate, N,N'-dinitroso N,N'-dimethyl terephthalamide, and the like, in the polymer composition along with the flame-retardant additives, heating the mixture above the softening point of the polymer to the decomposition point of the blowing agent, and permitting the liberated gas to expand the polymer composition into a foamed state.

The flame-retardant foamed polyethylene of the invention is useful as insulation, in packaging applications, for forming gaskets, as sealant backers in certain types of construction, etc.

The following non-limiting examples serve to illustrate my invention.

EXAMPLE I 100 parts by weight of polyethylene having a melt index of 2, together with 8 parts of antimony trioxide, 6⅔ parts of chlorinated paraffin wax containing about 70 percent chlorine and 1⅓ parts of hexabromobenzene was compounded thoroughly in a Banbury mixer at temperatures between 120–150° C., such that the entire mass was plastified and homogenous, then cooled and ground up into fine particles. The compound mixture was fed into a plastics extruder at a rate corresponding to 5 pounds of the mixture per hour. The plastic extruder employed in the experiment comprised a barrel having a 1¼ in. diameter screw equipped with a mixing head similar in design to that described in U.S. Pat. 2,453,088. A sealing plate was positioned midway of the screw. An inlet to the barrel of the extruder was provided adjacent to the sealing plate for feed of a volatile organic compound as blowing agent into the barrel and into contact with a heat-plastified polyethylene. The sealing plate formed a constricted passageway between the rim of the plate and the bore of the barrel so that flow of the heat-plastified polyethylene through the constricted passageway by pressure of the flights of the screw formed an effective plastic seal against counter-current flow or leakage of the volatile organic compound from the extruder. The heat-plastified polyethylene formation was forwarded under pressure of the screw around the sealing plate and into the second section of the barrel of the extruder wherein it was mixed with 1,2-dichlorotetrafluoroethane as a foaming agent fed thereto at a rate of 0.8 lb./hr. The resulting mixture was blended under pressure e.g. 500–600 lbs./sq. in. gauge, principally by action of the mixing head on the screw of the extruder, into a uniform gel composition and was brought to a temperature of 112° C., then was forced through a discharge orifice of ¼ x ⅛ in. cross-section into the atmosphere. The extruded material was allowed to expand freely in the air. The polyethylene foam product was a cellular oval rod having a cross-section of 21 x 9 mm. and was composed of substantially uniform fine individually-closed thin-walled cells. The foam had a density of about 3 lbs./cu. ft.

The product was tested for its self-extinguishing properties by the following procedure: a sample of the product was inclined at a 30° angle below the horizontal while in a draft-free enclosure; a gas flame 1 in. high was applied to the lower end of the sample until it was ignited; the flame was then removed. The time for the ignited foam to extinguish itself was measured; this procedure was repeated a plurality of times on the foam. The self-extinguished times reported are an average of 30 tests.

The above product had a self-extinguishing time of 2 seconds.

For purposes of comparison, polyethylene foam was prepared and tested under similar conditions except for using 8 parts per 100 parts of polymer of antimony trioxide and 8 parts of chlorinated paraffin wax containing about 70 percent by weight of chlorine. The foam obtained by this procedure had a self-extinguishing time of 10.1 seconds.

I claim:

1. A foamed polyethylene article comprising (1) an antimony compound selected from the group consisting of antimony trioxide, antimony pentoxide and antimony sulfide, and (2) a halogen-containing aliphatic or cycloaliphatic compound having a hydrogen atom or halogen atom attached to a carbon atom α to a halogen substituted carbon atom and containing from about 50 to 80 percent by weight of halogen, characterized in that it also contains (3) a bromine-containing aromatic or acyclic compound, the acyclic compound either containing vinyl bromine or not having a hydrogen or halogen atom attached to a carbon atom α to a bromine substituted carbon atom, the self-extinguishing agents being present in from 12 to 16 parts by weight per 100 parts of polyethylene and in ratios within the area ABCDEF of the accompanying drawing.

2. The article of claim 1, wherein the halogen of compound (2) is chlorine or bromine.

3. The article of claim 2, wherein the compound of (2) contains from 3 to 40 carbon atoms.

4. The article of claim 1, wherein the aromatic compound of (3) contains from 6 to 12 carbon atoms in the aromatic ring structure, and the acyclic compound of (3) contains from 3 to 15 carbon atoms.

5. The article of claim 1, wherein the compound of (2) contains from 3 to 40 carbon atoms and the halogen is chlorine or bromine, the aromatic compound of (3) contains from 6 to 12 carbon atoms in the aromatic ring structure, and the acyclic compound of (3) contains from 3 to 15 carbon atoms.

6. The article of claim 1 wherein the antimony compound is antimony trioxide.

7. The article of claim 1, wherein the compound of (2) is chlorinated paraffin wax containing about 70 percent chlorine.

8. The article of claim 1, wherein the compound of (3) is hexabromobenzene.

9. The article of claim 1, which contains 8 parts by weight of antimony trioxide, 6⅔ parts by weight of chlorinated paraffin wax containing about 70 percent chlorine, and 1⅓ parts by weight of hexabromobenzene.

10. A foamed polyethylene article containing a mixture of self-extinguishing agents comprising (1) an antimony oxide selected from the group consisting of antimony trioxide, antimony pentoxide and antimony sulfide; (2) a member selected from the group consisting of a chlorinated paraffin wax containing between about 50 and 80 percent by weight chlorine, hexachlorocyclohexane, pentabromomonochlorocyclohexane, hexabromocyclohexane, tris(2,3-dibromopropyl)phosphate and brominated polybutadiene latex, characterized in that the copolymer composition is a copolymer of from about 99 to 70 weight percent ethylene and from 1 to 30 weight percent of a vinyl alkanoate or a lower alkyl acrylate or methacrylate, and (3) a bromine compound selected from the group consisting of hexabromobenzene, pentabromomonochlorobenzene, tetrabromodichlorobenzene, tetrabromobenzene, pentabromophenol, tetrabromobisphenol-A, bis(pentabromophenyl)ether and tribromophenol, acyclic compounds having vinylic bromine or not having a hydrogen atom or bromine atom attached to a carbon atom α to a bromine substituted carbon atom, pentaerythrityl tetrabromide, 2,2-bis(bromomethyl)-1-bromo-3-hydroxypropane, the self-extinguishing agents being present in from 12 to 16 parts by weight per 100 parts of polyethylene and in ratios within the area ABCDEF of the accompanying drawing.

References Cited

UNITED STATES PATENTS

| | | | |
|---|---|---|---|
| 2,532,243 | 11/1950 | Ott | 260—2.5 |
| 2,590,211 | 3/1952 | Rugar | 252—8.1 X |
| 2,669,521 | 2/1954 | Bierly | 106—15 |
| 2,894,918 | 7/1959 | Killoran et al. | 260—2.5 |
| 2,962,464 | 11/1960 | Feild | 106—15 X |
| 2,986,535 | 5/1961 | Jacobson | 260—2.5 |
| 3,137,745 | 6/1964 | Johnstone | 260—2.5 X |
| 3,188,295 | 6/1965 | Ballast | 260—2.5 |
| 3,269,962 | 8/1966 | Eichhorn | 260—2.5 |

JOHN T. GOOLKASIAN, Primary Examiner

D. J. FRITSCH, Assistant Examiner

U.S. Cl. X.R.

161—403; 252—8.1; 260—28.5 D, 45.7 P, 45.75 R, DIG 24

PO-1050
(5/69)

UNITED STATES PATENT OFFICE
CERTIFICATE OF CORRECTION

Patent No. 3,639,304            Dated 1 February 1972

Inventor(s) Charles F. Raley, Jr.

It is certified that error appears in the above-identified patent and that said Letters Patent are hereby corrected as shown below:

Column 2, line 44, insert --%-- after "80".

Column 5, line 7, delete "extinguished" and insert --extinguishing--.

line 27, delete "vinyl" and insert --vinylic--.

Column 6, line 19, delete "alower" and insert -- a lower -- line 27, insert --such as-- between "atom," and "pentaerythrityl".

Signed and sealed this 22nd day of August 1972.

(SEAL)
Attest:

EDWARD M. FLETCHER, JR.            ROBERT GOTTSCHALK
Attesting Officer                    Commissioner of Patents